United States Patent
Flegal

(10) Patent No.: US 9,303,212 B2
(45) Date of Patent: Apr. 5, 2016

(54) SINGLE SOLVENT METHOD AND MACHINE FOR SEPARATING BITUMEN FROM OIL SAND

(71) Applicant: Michael James Flegal, Calgary (CA)

(72) Inventor: Michael James Flegal, Calgary (CA)

( * ) Notice: Subject to any disclaimer, the term of this patent is extended or adjusted under 35 U.S.C. 154(b) by 348 days.

(21) Appl. No.: 13/855,440

(22) Filed: Apr. 2, 2013

(65) Prior Publication Data

US 2013/0270156 A1 Oct. 17, 2013

Related U.S. Application Data

(60) Provisional application No. 61/623,916, filed on Apr. 13, 2012.

(51) Int. Cl.
*C10G 1/04* (2006.01)
*C10G 1/00* (2006.01)

(52) U.S. Cl.
CPC ........................................ *C10G 1/04* (2013.01)

(58) Field of Classification Search
CPC ............. C10G 1/00; C10G 1/04; C10G 1/045
See application file for complete search history.

(56) References Cited

U.S. PATENT DOCUMENTS

| | | | |
|---|---|---|---|
| 1,791,797 A | | 2/1921 | Clark |
| 2,041,276 A | * | 5/1936 | Bray ............................... 208/34 |
| 3,779,902 A | * | 12/1973 | Mitchell ............... C10G 21/003 208/251 R |
| 5,998,640 A | * | 12/1999 | Haefele et al. .................. 554/12 |
| 7,384,557 B2 | | 6/2008 | Phillips et al. |
| 7,909,989 B2 | | 3/2011 | Duyvesteyn et al. |
| 2011/0017642 A1 | * | 1/2011 | Duyvesteyn .................. 208/390 |
| 2011/0062057 A1 | * | 3/2011 | Duyvesteyn .................. 208/390 |
| 2012/0029259 A1 | * | 2/2012 | McFarlane ............. C10G 33/04 585/864 |
| 2012/0305451 A1 | | 12/2012 | Adeyinka et al. |

FOREIGN PATENT DOCUMENTS

CA 2520943 C 11/2011

OTHER PUBLICATIONS

Ross, J.R.H. (2011). Heterogeneous Catalysis Fundamentals and Applications, 1st ed., Elsevier, 232 pgs [Office action cites p. 195].*

* cited by examiner

*Primary Examiner* — Brian McCaig
(74) *Attorney, Agent, or Firm* — Ryan W. Dupuis; Kyle R. Satterthwaite; Ade & Company Inc.

(57) ABSTRACT

A single solvent method and machine for separating bitumen from oil sand ore are disclosed. The method includes the use of a single light paraffinic solvent, such as propane or butane as the agent to separate the bitumen from mined oil sand ore. Since light paraffinic solvents are vapors at atmospheric pressure and temperatures, the ore is placed in a pressurized container so that the solvent remains in a liquid state. When the container is pressurized, by the addition of the solvent itself, the liquid solvent is mixed with the ore to effect separation. The proposed machine settles more than 80% of the solids out under gravity in a modest period of time. The solvent-bitumen mixture is drained after the cleaning cycle, the container is depressured to a vapor recovery system and the remaining solids dumped out. The fine solids, drained with the liquids, are separated from the liquid mixture with relative ease by the use of current technology in other downstream equipment.

4 Claims, 8 Drawing Sheets

SINGLE SOLVENT METHOD AND MACHINE FOR SEPARATING BITUMEN FROM OIL SAND

This application claims priority to U.S. provisional application Ser. No. 61/623,916, filed Apr. 13, 2012.

FIELD OF THE INVENTION

This disclosure relates generally to the recovery of bitumen from oil sands by means of light solvents.

BACKGROUND OF THE INVENTION

The Athabasca oil sands in north east part of the province of Alberta now comprise one of the largest remaining oil reserves in the world. The oil bearing geological formation is shallow near the Alberta-Saskatchewan border and is located a few tens of meters below the surface there. The formation slopes to the west such that, in 10-20 km, it is more than 300 m below the surface. As a result, there are two methods being used to extract the oil from the ground. Mining is economically viable where the formation is less than 70 m below the surface. "In Situ" processes, where horizontal oil wells are drilled, are used when the formation is deeper than is economically minable. Mining has a higher recovery ratio since the entire ore body is accessible.

Oil sand is comprised of three main components: solids, oil and water. The solids can be sub-classed into sands and silt/clay particles. The sand particles are larger than the silt/clay particles, ranging from stones and pebbles down to fines near 1 µm diameter. Silts and clays are finer particles and tend to be between 100 and 0.1 µm in size. FIG. 1 shows the solids particle size distribution for a number of types of ore bodies in the Athabasca region. Curves 1, 2 and 3 correspond to ore bodies with higher sand content. Curves 4 and 5 correspond to ore body with higher silt and clay content since more than 60 wt % of the particles are smaller than 100 µm. There are ore bodies with even higher silt/clay content. As a broad rule, the bitumen content of the ore varies inversely with the concentration of fines. The term "fines" is applied to particles smaller than 44 µm. Vertical line A represents this boundary on FIG. 1. Generally, the wt % passing of fines is less than 30% for ore bodies bearing more than 7% bitumen. 7% bitumen is considered near the lower limit of economic recoverability for current technology. Curves 4 and 5 would not be representative of economically viable ore bodies since the fines contents are 38% and 43% respectively.

The oil can be sub-classed into bitumen and asphaltenes. Bitumen is the desired component because it can be readily upgraded into synthetic crude oil. Asphaltenes are components with high carbon content. They also contain sulfur, metals and aromatic molecule groups. The molecules are large but also form solid crystalline conglomerations of molecules. The asphaltene particles range from nanometer to micrometer scales and they form 17-18 wt % of the oil mixture. While they are solid they are considered to be part of the oil component. They are undesirable because they increase the viscosity of the bitumen mixture and, more importantly, because they disrupt the upgrading process. Asphaltenes tend to "coke" the upgrading vessels and equipment, requiring expensive maintenance and down time.

The water component of the oil sand is important. Solid particles are hydrophilic and tend to be within the water component of the ore. The sand particles are "wetted" with a fine layer of water, approximately 10 nm in thickness. Where the sand grains touch, a pendular ring of water forms by surface tension. Oil is hydrophobic and coats the sand grains outside of the water layer. This is an important factor. It means that when the ore is immersed in solvents, the bitumen is accessible to the solvent without disturbing the water layer. The remainder of the interstitial space between the oil coated sand grains is filled with water. This interstitial water component contains a large part of the fines content of the oil sand because the fines are hydrophilic. Nevertheless, there are still fines incorporated into oil phase of the ore and these become the most difficult solids to separate from the bitumen.

The mass fraction ranges for the various components in commercially viable oil sand are listed in Table 1.

TABLE 1

Oil Sand Ore Component Mass Fractions

| Component | Wt % |
|---|---|
| sand | 81-88 |
| silt/clay | |
| water | 3-6 |
| bitumen | 5-13 |
| asphaltenes | 1-3 |

It is important to emphasize that the separation of the solids from the bitumen must be nearly complete for commercial processing. For a low grade ore of 7% bitumen, 99.94% of the solids must be removed from the bitumen stream to meet the pipeline specification of less than 0.5 wt % solids and water.

Bitumen and Solvent Properties

Bitumen is highly viscous. To separate the bitumen from the solids, the viscosity of the bitumen must be reduced so that it will flow away from the sand. The two main methods of reducing the bitumen viscosity involve increasing the bitumen temperature, or diluting the bitumen with a solvent.

FIG. 2 shows an exponential decrease in viscosity with temperature. The viscosity of pure bitumen (0% solvent) drops three orders of magnitude with a temperature increase of 60° C. For this reason, all of the processes used in the current art involve some amount of heating. However, this viscosity decrease is insufficient to allow the solids to be separated from the bitumen. At a temperature of 80° C., pure bitumen has a viscosity of 1000 mPa-s, which is similar to that of thick syrup. Further viscosity reduction is required, and is accomplished by means of solvents. FIG. 2 shows that propane solvent, mixed in a 50% mass fraction reduces the viscosity of the bitumen by more than six orders of magnitude. Therefore, the addition of propane solvent offers a substantial advantage over any known heating methods.

There are two broad classes of solvents: Paraffinic solvents and aromatic solvents. Paraffinic solvents are non-ringhydrocarbon chain molecules ranging from propane, with three carbon atoms, to very long chains. Methane and ethane (one and two carbon atoms) have triple points lower than atmospheric temperature and pressure and therefore cannot be liquids at the temperatures and pressures normally encountered in these applications. Therefore, methane and ethane cannot be used as solvents. Shorter chain paraffins make better solvents because of their lower density and viscosity and also because they do not dissolve asphaltenes well. The disadvantage of these solvents is that they are either vapors at atmospheric pressure and 20-80° C., or they have very high vapor pressures and thus tend to evaporate even if they are liquids.

Table 2 shows that the boiling temperature of the solvents increases with higher molecular weight. Propane, butane, pentane or hexane cannot be used as solvents at atmospheric pressure and 80° C. because they would all boil away. Heptane would experience significant losses to the atmosphere because it would evaporate quickly.

TABLE 2

Solvent Properties

Solvent Properties (1)

| Solvent | Molecular Weight kg/kg-mole | Boiling Temp. (2) ° C. | Vapor Pressure MPa (abs) | Density kg/m³ | Dynamic Viscosity mPa-s |
|---|---|---|---|---|---|
| Propane | 44.0956 | −42.12 | 3.264 | 365 | 0.047 |
| Butane | 58.1222 | −0.50 | 1.062 | 497 | 0.093 |
| Pentane | 72.1488 | 36.06 | 0.392 | 559 | 0.137 |
| Hexane | 86.1754 | 68.72 | 0.153 | 599 | 0.175 |
| Heptane | 100.2019 | 98.38 | 0.061 | 629 | 0.223 |
| Naphtha | (3) | 30-200 | (3) | 600-850 | 0.980 |

(1) At 82.2° C. and at the vapor pressure noted.
(2) At atmospheric pressure, 101.325 kPa.
(3) Naphtha is a mixture of solvents, containing paraffins from C5-C12 as well as aromatic solvents. All values in this row are approximate and depend on the particular grade of naphtha.

As the molecular weight of a paraffinic solvent increases, its behavior becomes more like aromatic solvents in its ability to dissolve asphaltenes.

Aromatic solvents have heavier molecular weights and are liquids at atmospheric pressure and temperature. Naphtha, a mixture of paraffinic and aromatic elements, is a commonly used solvent.

Clark Hot Water Extraction Process

The current state of the art is the Clark hot water extraction process. This process is described in U.S. Pat. No. 1,791,797 by Karl Adolf Clark. Numerous improvement patents for this process also exist. The Clark process requires substantial physical equipment. Ore is mined, crushed and mixed with hot water and caustic in large atmospheric pump boxes. The slurry mixture is pumped from the pump boxes in large hydrotransport pipelines to an extraction plant. The hydrotransport pipeline serves two purposes; to transport the ore and to ensure that the oil, water and sand are thoroughly mixed. When the slurry reaches the extraction plant it flows into large primary separation cells where, with recirculation pumps, an oily froth is created and most of the sand is separated from the oil. Water and solids are sent to the tailings ponds while the remaining solid fines and froth are sent to the froth treatment plant. The froth is mixed with solvents to lower the bitumen viscosity and to allow the final separation of the bitumen from the water and solids. The water extraction process understandably uses a large amount of water. The water usage varies from 5 to 9 m³ of water per m³ bitumen depending on the quality of the ore. A significant portion of this water is recycled back from the tailings ponds where the solids have settled out. Nevertheless, about 3 to 5 m³ of water per m³ bitumen is made up from fresh water sources. Energy use varies from 3 to 5 GJ/m³ of bitumen; much of this energy is spent on heating and moving water about. A significant amount of heat is lost when the hot water is sent to the tailings ponds. This loss varies from 1 to 2 GJ/m³ of bitumen with an average of 1.7 GJ/m³. An important disadvantage of this system is that the fines, which are concentrated in the interstitial water within the ore, are mixed with large volumes of water, diluting them. The interstitial water/fines mixture is a difficult separation by-product to re-concentrate and to dispose of. Fines do not settle out of the water easily, even after decades. The mixed fines and water build up over time, requiring ever larger settling ponds, called tailings ponds, to be constructed.

These ponds have attracted much adverse attention because flocks of migrating wildfowl have been trapped and killed in the oily tailings. The government of Alberta has directed that the current system is unsustainable. The current tailings ponds must be cleaned up and future facilities must include some, as yet undefined, improved technology to reduce pond size or eliminate them entirely.

Solvent Based or Solvent Assisted Mining Extraction

Numerous patents disclose the use of solvents for bitumen extraction in mining applications. Most of these utilize a single heavy solvent that remains as a liquid at atmospheric pressure and temperature in a continuous fashion. The continuous nature of these methods and machines require that the oil sand and solvent be mixed at atmospheric pressure. These methods and machines do well in separating the bitumen from the oil sand but have difficulty with the fines that are carried away with the solvent bitumen mixture. Because the solvent-bitumen mixture still has a relatively high viscosity, the fines are not easily separated. If lighter solvents are used, they tend to evaporate and are lost to the atmosphere.

A number of patents overcome this disadvantage by using a two solvent system. The first solvent is a heavy solvent, such as naphtha, which acts to separate the bitumen from the coarse sand and also as a slurrying agent to allow the mixture to be transported to pressurized containers. The second solvent, such as propane, butane or hexane, is used to wash the first solvent, lowering its viscosity and allowing complete separation of the fines. Recent examples of such patents include U.S. Pat. No. 7,909,989 by Willem Duyvesteyn, et al., U.S. Patent Application No. 2012/0305451A1 by Olusola Adeyinka, et al., and Canadian patent 2,520,943 by Vining Wolff, et al.

U.S. Pat. No. 7,384,557 (the '557 patent) describes the use of a single solvent, including paraffinic solvents with both batch and continuous embodiments. This technique uses a series of screws or solids piston pumps to move the ore to several pressurized extraction chambers. The batch embodiment utilizes a complex system and involves multiple filters and a liquid-liquid separation unit.

Improvements of the Proposed Method and Machine Over Hot Water Processes

The proposed method and machine constitutes an improvement over the hot water extraction process because it accomplishes the majority of the work done by the hot water separation systems in one vessel. It radically reduces the amount of water and solids being physically moved, heated, stored and recycled. The four main areas of improvement are:

1. Decreased Capital Costs

Less equipment will be required by this proposed invention, and the required equipment will be smaller. The water supply and preheating and storage systems will be much smaller than the current system in capacity. No slurry preparation or hydrotransport or primary extraction systems will be required. They are replaced by the batch separation machines. The froth treatment systems will be replaced by water wash systems of modest size since they are handling concentrated mixtures, not low density froth streams.

2. Lower Heat Energy Use

As noted above, the Clark process uses 3-5 GJ/m³ of bitumen produced, with heat losses to tailings ponds averaging 1.7 GJ/m³. The proposed system is expected to have three main heat loads, as described in Table 3:

TABLE 3

Single light Solvent Method Energy Use

| FIG. 1 Curve # | Solvent recovery | Ore heating GJ/m³ of bitumen | Water heating | Total |
|---|---|---|---|---|
| 1 | 0.41 | 0.53 | 0.28 | 1.22 |
| 2 | 0.41 | 0.63 | 0.36 | 1.40 |
| 3 | 0.41 | 0.79 | 0.44 | 1.64 |

It can be clearly seen that the total heat usage is less than the Clark water heating losses alone.

3. Diminished Water Use

As noted above the Clark process uses 5 to 9 m³ of water per m³ of bitumen produced. The net usage of water by the Clark process is 3 to 5 m³ of water per m³ of bitumen produced. This is compared to a range of 1 to 2 m³ water per of bitumen for this proposed method and machine.

4. Tailings Ponds Reduced or Eliminated

The quantity of water being used in the applicant's method to separate the fines from the solvent-bitumen mixture for average and high grade ore (FIG. 1, curves 1, 2 and 3) is such that it can be returned to the mine pit without creating any tailings ponds. Low grade ores with high fines contents (>25% by wt %) may require tailings ponds. It is expected that these ponds would be very much smaller than those currently required.

Improvements Over Solvent Extraction Methods

Solvents which are liquids at atmospheric pressure and moderate temperatures have viscosities that are too high to permit efficient separation of fines from the solvent-bitumen mixture. Therefore, these prior art patents are not economically viable unless large settling tanks are used to hold the solvent-bitumen mixture for long periods of time to allow settling, or large numbers of centrifuges are used to accelerate the separation. The applicant's proposed method and machine constitute an improvement over single heavy solvent methods and machines because of its ability to separate a large proportion of the fines in the machine itself, leaving the remainder in a low viscosity fluid that allows further separation with relative ease. The recovery of light paraffin solvents requires much less energy use than that for heavy solvents that are conventionally used.

The applicant's method and machine constitute an improvement over dual solvent methods because the same result is accomplished with substantially less equipment, since only a single solvent recovery system is required. The light solvent is used to maximum advantage in the first separation, causing more than 80% of the solids to be removed in that first step. It is expected to use less energy since only one solvent needs to be recovered and because the recovery of light paraffin solvents requires less heat. Such light solvents flash to vapor using the heat stored in the bitumen, and they may immediately be recovered by condensation.

Improvements Over the Single Paraffinic Solvent System

The system described in U.S. Pat. No. 7,384,557 has a number of characteristics that are not required or are opposite to the applicant's proposed method and machine, as described below.

i) augers and paddles are required to move and mix the material.

The applicant's method requires no mechanical machinery for moving or mixing solids.

ii) a system of inert gas injection is required to maintain pressure. This is required because the temperature must be kept as low as possible to avoid denaturing of the oil, or the process will not work properly.

The applicant's proposed method teaches away from this '557 disclosure and in fact works better at higher temperatures. In the applicant's method, the pressure is maintained by having sufficient liquid solvent in the container so that the pressure will be the vapor pressure of the solvent at the bulk temperature of the materials in the container.

iii) a solvent injection system which enters the container in a manner to cause a vortex flow.

The circulation of solvent in the applicant's method is upwards rather than radial. In this manner, small solid lumps are carried upwards, larger lumps fall and abrade against each other. Further, the turbulent mixing at the bottom of the container causes more abrasion and mixing.

iv) the batch method described in the '557 patent is based on a filter separation method. Application of filters to oil sands is problematic. The filter in the container must be physically robust to withstand battering when the ore is dumped in from above, yet the filter passing size must be quite small, around 0.1 mm (100 µm) to retain even half of the solids in the container. The filter would be subject to clogging with fines and would be difficult to clean.

The applicant's proposed design is based on a gravity separation method. The use of gravity settling is a substantial and non-obvious change from the conventional filter design.

SUMMARY OF THE INVENTION

Among the objects of the present invention are to provide a method and apparatus to extract bitumen from oil sands ore that uses a single light paraffinic solvent in a discontinuous or batched process.

The method is summarized in FIG. 4 and comprises the following steps: adding a quantity of oil sand ore in a container and sealing, pressurizing and filling the container with a light paraffinic solvent, agitating the oil sand ore and solvent to create a first mixture of enriched bitumen and solvent, allowing the fines to settle out, adding some water to displace solvent and bitumen upwards out of the solids layer, rotating the container to fully drain the first mixture of bitumen enriched solvent to other equipment for further separation of solids, depressurizing the container to a vapor recovery system, rotating and unsealing the container and then removing the first mixture of bitumen depleted sand, and finally, cleaning the remaining sand from the container and rotating to the filling position.

FIG. 3 depicts the machine to be used in this method. The main components of the machine are as follows:
  a) A container or vessel capable of retaining the material comprising bitumen and solvent under pressure at the operating temperature.
  b) A sealing mechanism or mechanisms that allow the container to be opened and closed at the beginning and end of the cycle for filling and dumping with ore.
  c) A rotating mechanism or mechanisms to allow the orientation of the envelope to be changed to allow for the various steps in the cleaning cycle.
  d) A solvent recycle system that flushes the solvent upwards through material comprising bitumen to ensure mixing.
  e) A flexible piping system that moves with the machine for filling the envelope with liquids.
  f) A flexible piping system that moves with the machine for draining fluids from the envelope.
  g) A flexible piping system that moves with the machine for venting the envelope.

BRIEF DESCRIPTION OF THE DRAWINGS

Embodiments of the invention will now be described with reference to the accompanying drawings, in which:

FIG. 1 also depicts the proportion of solids that may be separated in the machine and by other means.

DETAILED DESCRIPTION OF THE PREFERRED EMBODIMENTS

Mixture Viscosity and Particle Settling Time Calculations

The viscosity reduction gained by means of the use of light hydrocarbon solvents is the most important factor driving the design of this method and machine. The viscosity of the solvent-bitumen mixture is accurately calculated using Lederer's equation 1):

$$\mu_{mix} = \mu_{Solvent}^{fs} * \mu_{Bitumen}^{fb} \quad 1)$$

In equation 1), $\mu$ is dynamic viscosity, measured in milli-Pascal seconds, mPa-s. The dimensionless exponents for solvent and bitumen, $f_s$ and $f_b$, sum to unity and are calculated using equation 2)

$$f_b = \frac{\alpha * C_{vb}}{\alpha * C_{vb} + C_{vs}} \quad 2)$$

In equation 2), $\alpha$ is an empirical constant defined in equation 3) by Shu. $C_{vb}$ and $C_{vs}$ are the volume fractions of bitumen and solvent in the mixture which sum to unity.

$$\alpha = \frac{17.04 * \Delta\rho^{0.5237} * \rho_b^{3.2745} * \rho_s^{1.6316}}{\ln\left(\frac{\mu_b}{\mu_s}\right)} \quad 3)$$

In equation 3), $\rho$ is the specific gravity of bitumen, b and solvent, s. $\Delta\rho$ is the specific gravity of bitumen less that of solvent. The dynamic viscosities of bitumen and solvent are used in the natural logarithm term in the denominator.

Figure 2:
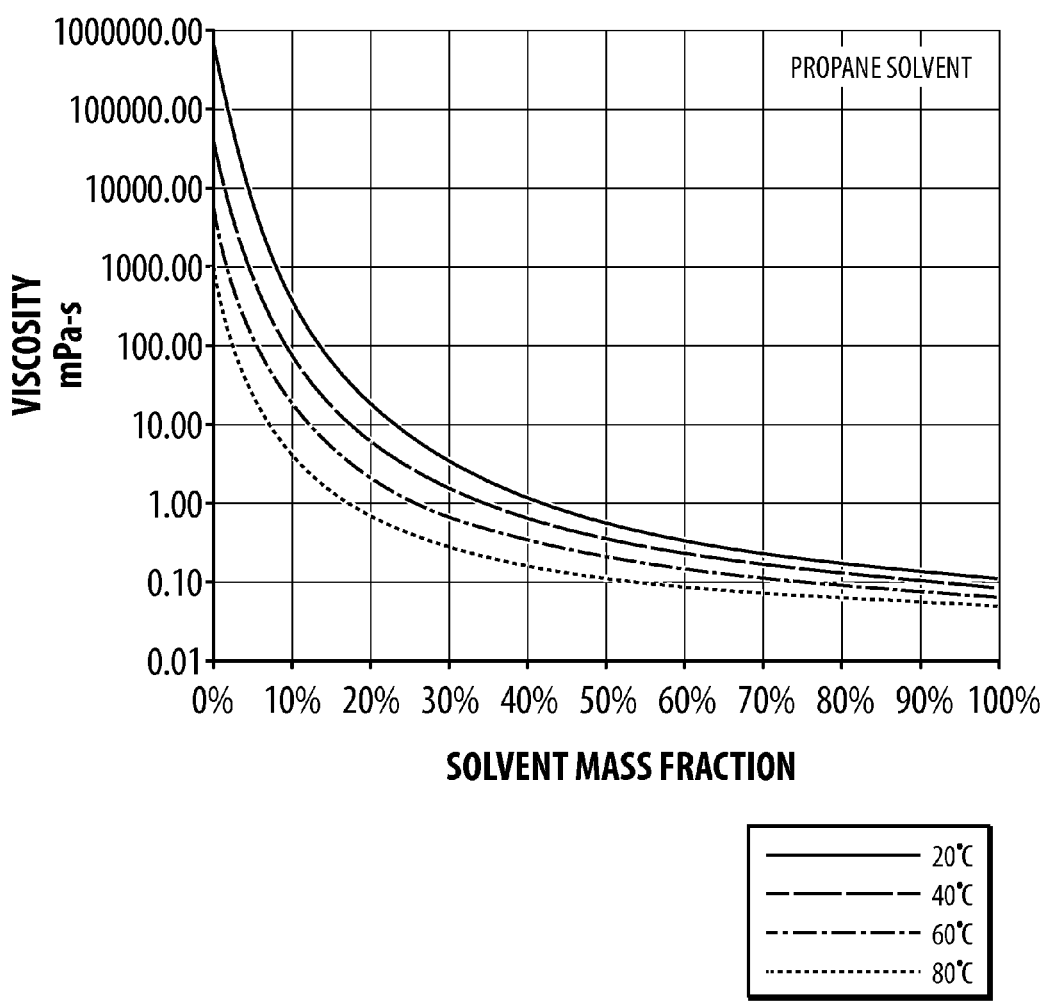
FIG. 2 depicts the viscosity of the solvent-bitumen mixture as a function of the solvent mass fraction for mixture temperatures from 20° C. to 80° C.

The dynamic viscosities of 1:1 solvent-bitumen mixtures for the various light solvents, listed in Table 4 below, were calculated using equations 1), 2) and 3). The input densities and viscosities are also listed. The viscosity of bitumen was fixed as 75,762 mPa-s (3) and the density as 998 kg/m³ (4) at a temperature of 35° C., according to FIG. 2. A 1:1 solvent-bitumen ratio was chosen because it provides a substantial viscosity reduction while maintaining modest recovery costs. The mixture density is calculated by using equation 4:

$$\rho_{mix} = \left[\sum \frac{Xi}{\rho i}\right]^{-1} \quad 4)$$

In equation 4) $x_i$ is the mass fraction and $\rho_i$ the density of the ith component.

TABLE 4

1:1 Solvent-Bitumen Mixture Properties at 35° C.

| | Solvent Properties | | 1:1 Solvent - Bitumen Mixture | |
|---|---|---|---|---|
| Solvent | Density $\rho_S$ kg/m³ | Dynamic Viscosity $\mu_S$ mPa-s | Density $\rho_{mix}$ kg/m³ | Dynamic Viscosity $\mu_{mix}$ mPa-s |
| Propane | 476 | 0.088 | 645 | 0.40 |
| Butane | 561 | 0.144 | 718 | 1.10 |
| Pentane | 611 | 0.200 | 758 | 2.02 |
| Hexane | 645 | 0.267 | 784 | 3.21 |
| Heptane | 674 | 0.348 | 802 | 4.70 |
| Naphtha | 720 | 0.960 | 836 | 15.12 |

Having determined the viscosity and density of the solvent-bitumen mixture, it is now possible to use Stokes' law is used to determine the time needed for solids to settle through the solvent-bitumen mixture. Stokes law determines the falling velocity of a sphere through a viscous liquid in laminar flow. There is evidence that Stokes law is very conservative in that it shows excessively slow falling velocities for fine particles. Stokes' law has been used as the basis of this analysis because it demonstrates that the proposed method will work even under very conservative assumptions. Stokes' law is defined in equation 5).

$$v_S = \frac{2 * (\rho_{Solid} - \rho_{liquid}) * r^2 * g}{9 * \mu_{liquid}} \quad 5)$$

Here, $v_s$ is the particle falling velocity in m/s. The $\rho$ variables are densities in kg/m³. The particle radius is r, in m. The acceleration due to gravity is g at 9.81 m/s². The liquid viscosity, $\mu_{liquid}$, is in Pascal seconds.

It is important to recognize that there is a synergistic effect of using lighter and lighter solvents. Both the density and viscosity of the mixture decrease with lighter solvents. This increases the ability of the mixture to allow finer particles to settle out in a given time.

It is possible to calculate the finest particles that will settle out in a given period under gravity by re-arranging Stokes' law. The Stokes velocity, Vs, is calculated by dividing the falling distance by the settling time. For the vessel, the settling distance was fixed as 2 m and the settling time, 10 min. Knowing Vs, it is possible to solve for r, the radius of the spherical particle, and then, multiplying by two to determine the diameter. Table 5 below shows the minimum particle size, D, that could be expected to settle in the vessel for each type of paraffinic solvent and naphtha. These calculated values are based on the input densities and viscosities listed in table 4.

Figure 1:
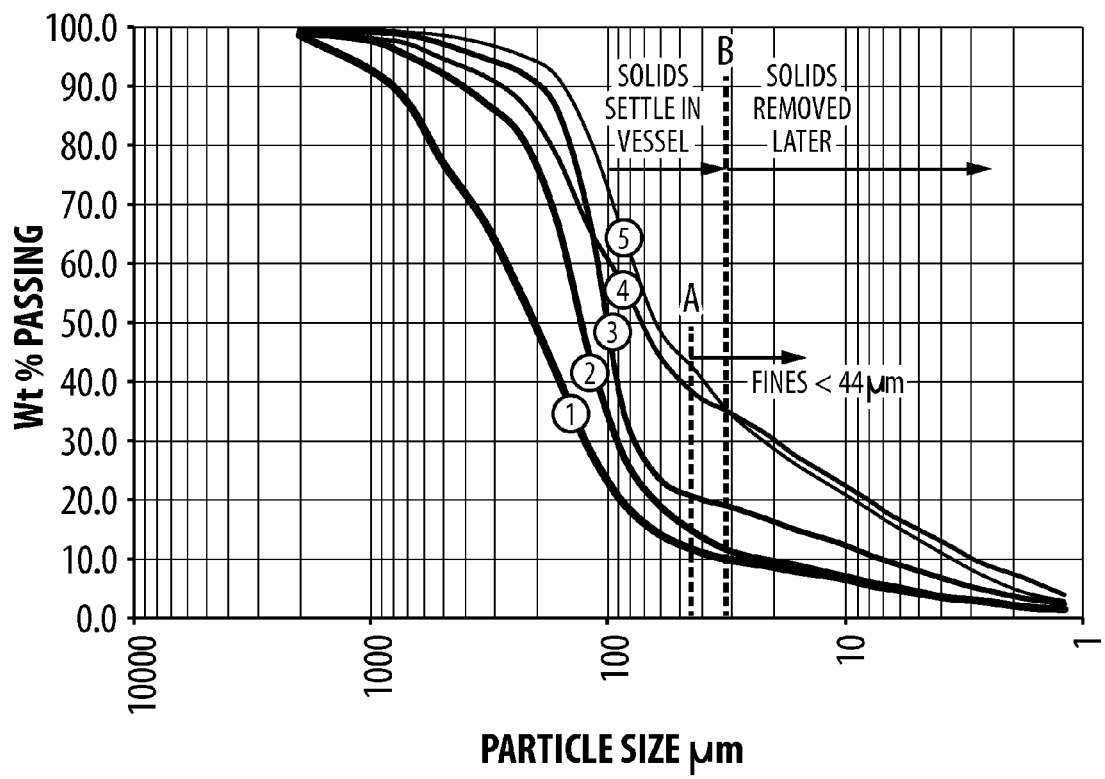
FIG. 1 depicts the solids particle size distribution for various oil sand ore bodies in the Athabasca region of Alberta.

Line B in FIG. 1 represents the boundary between solids that will settle in the allotted time in the vessel. The actual line location shown in FIG. 1 corresponds to propane solvent.

TABLE 5

Minimum Particle Size to Settle

|  | FIG. 1 Line B μm |
| --- | --- |
| Propane | 35 |
| Butane | 59 |
| Pentane | 81 |
| Hexane | 103 |
| Heptane | 126 |
| Naphtha | 228 |

Line B would shift to the left for the other solvents listed above. Clearly, propane is the most advantageous solvent because it removes most of the solids in vessel. For solids curve 3 in FIG. 1, propane would remove 81% of the solids in the vessel, whereas pentane would only remove 69%. Naphtha would settle less than 50% of the solids in this time. The amount of water required to wash the fines away is directly proportional to the amount of fines. This indicates the difficulties present when using heavier solvents described in the prior art.

The operating pressure for the machine is the vapor pressure of the solvent at the desired temperature. The vessel must be capable of being sealed and re-opened each cycle. With each opening and closing there is a possibility of the seal failing to retain pressure. The vapor pressure of propane is 1.22 MPaa at 35° C., whereas the vapor pressure of pentane is only 0.098 MPaa. The higher the pressure, the greater the likelihood that the sealing system may leak. This is a counterbalancing requirement to using the lightest possible solvent.

Method of Bitumen Separation

Figure 3:
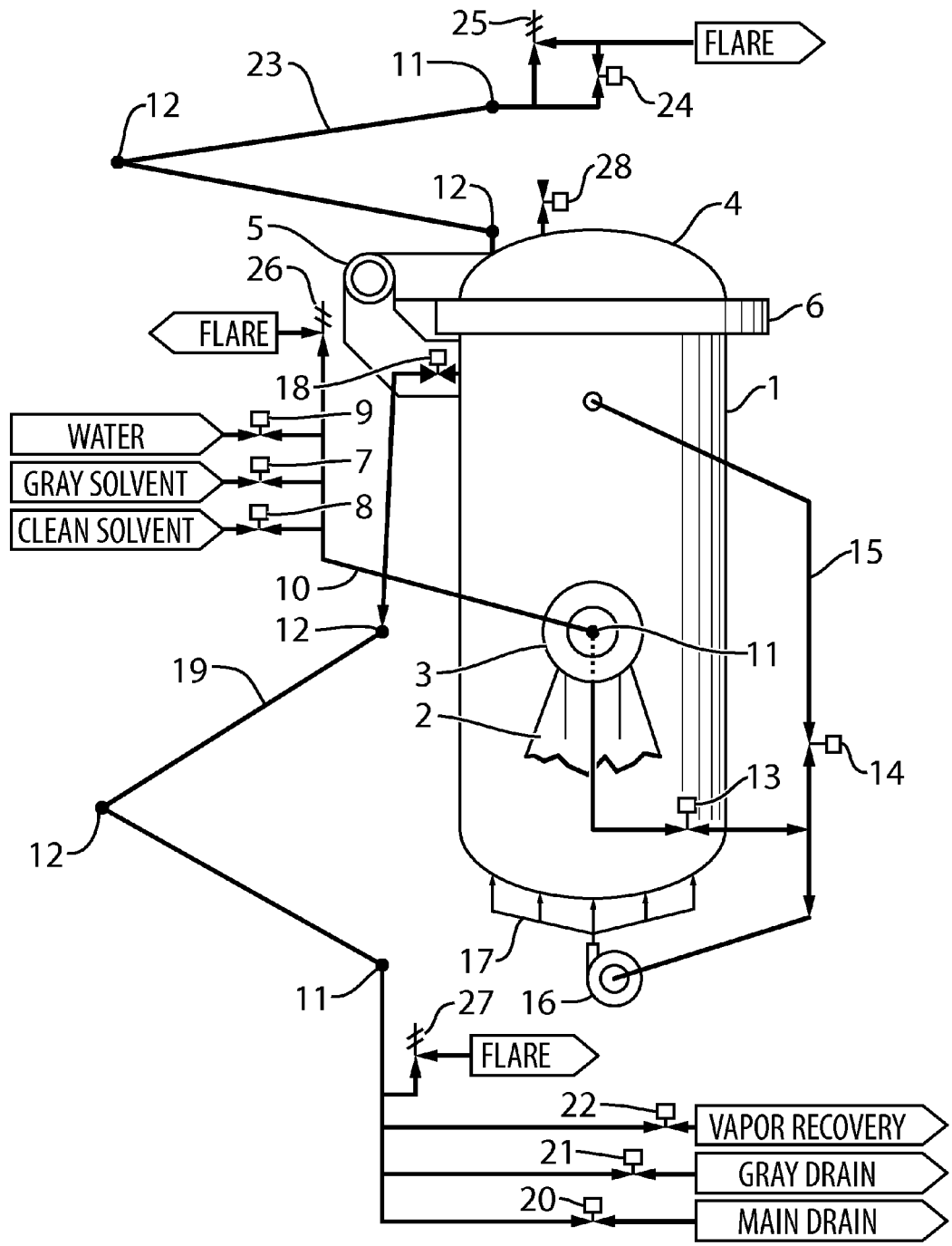
FIG. 3 is a schematic diagram representing an embodiment of a machine or apparatus for separating bitumen from oil sand ore.
Figure 4:
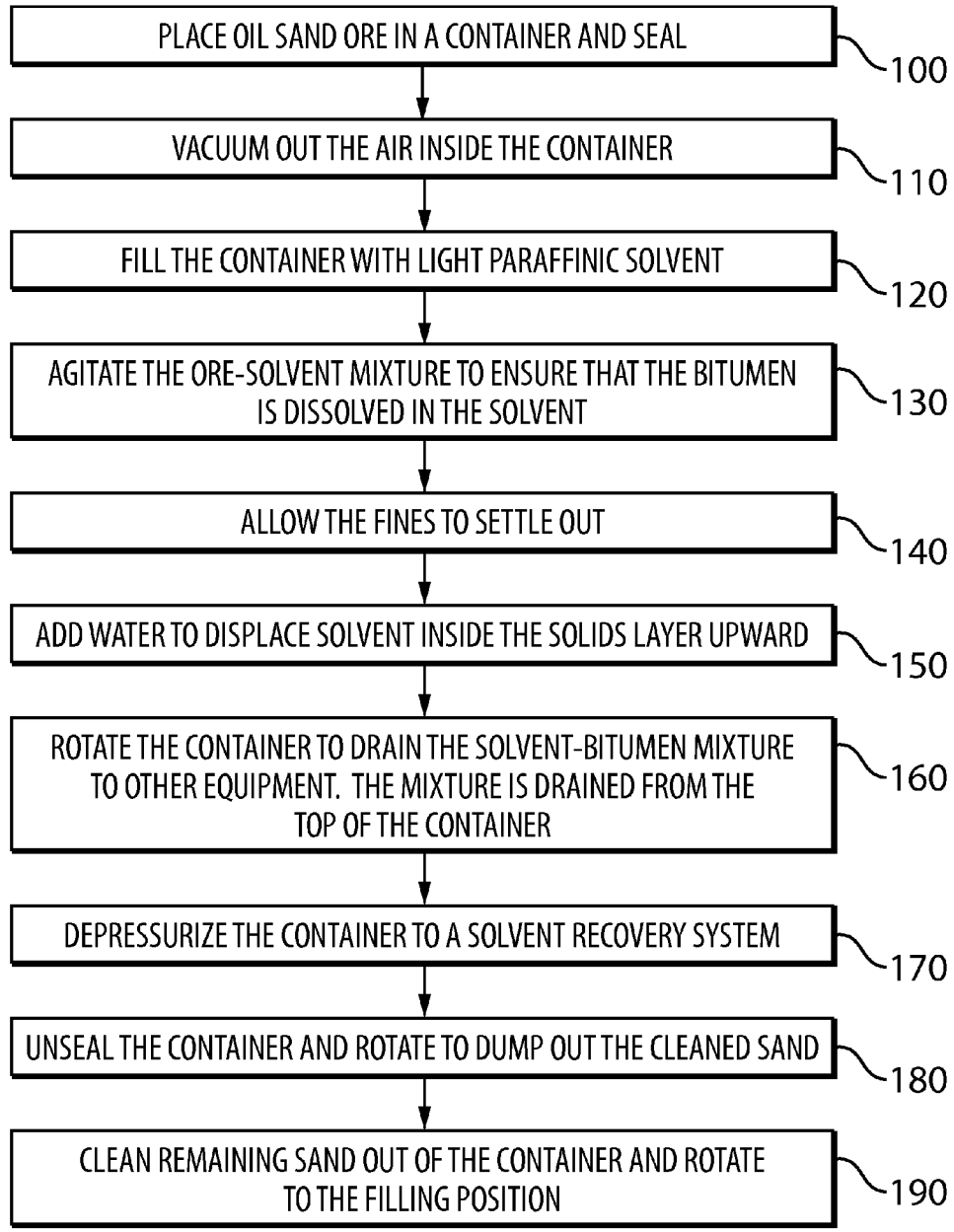
FIG. 4 is a summary flow chart describing a proposed embodiment for separating bitumen from oil sand ore.
Figure 5:
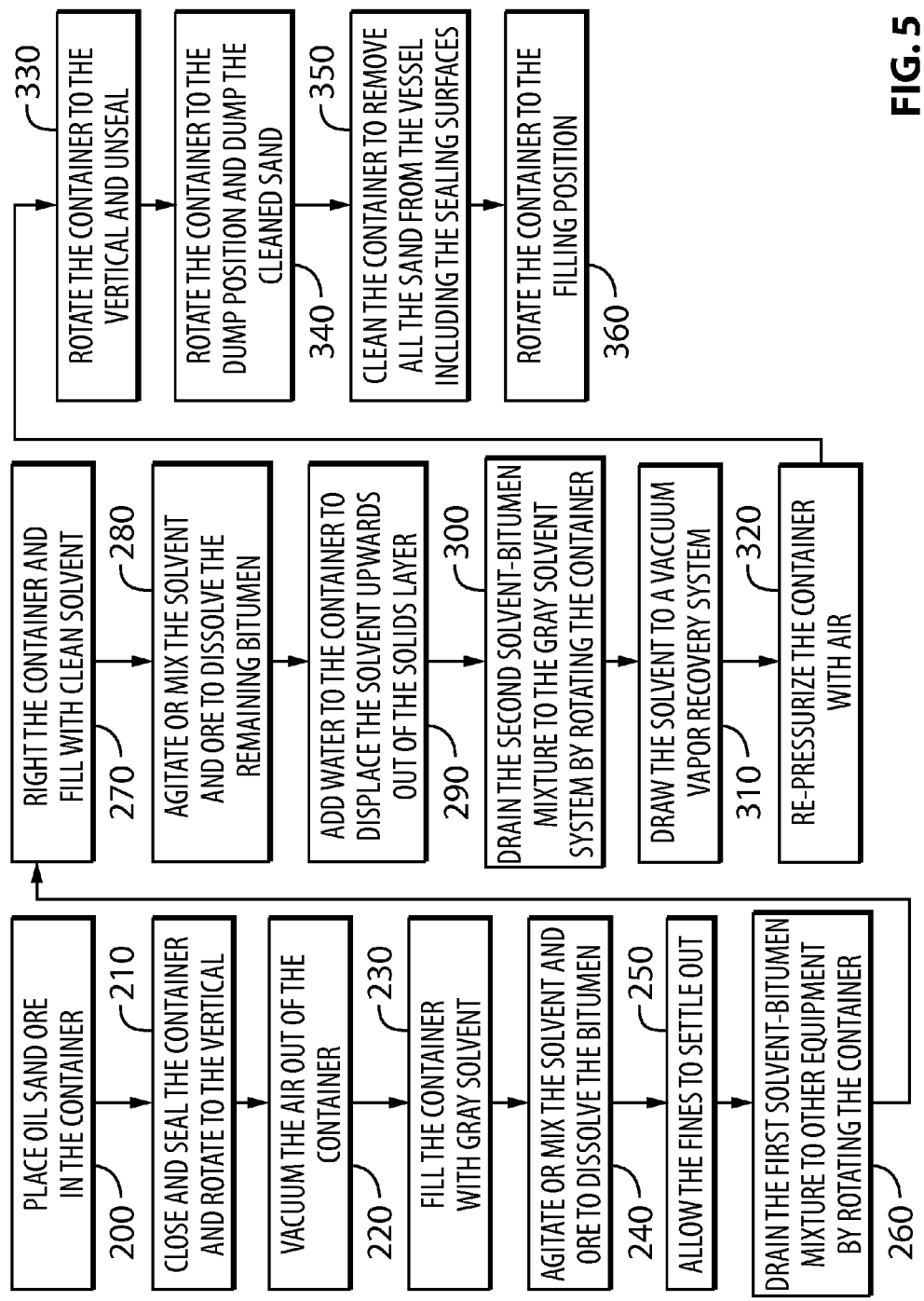
FIG. 5 is a detailed flow chart describing another proposed embodiment for separating bitumen from oil sand ore.

The following steps describe the detailed preferred embodiment and are depicted in FIG. 5. The equipment numbers are shown in FIG. 3 and the mechanical arrangement of the machine is depicted in FIGS. 6a through 6f.

Figure 6B:
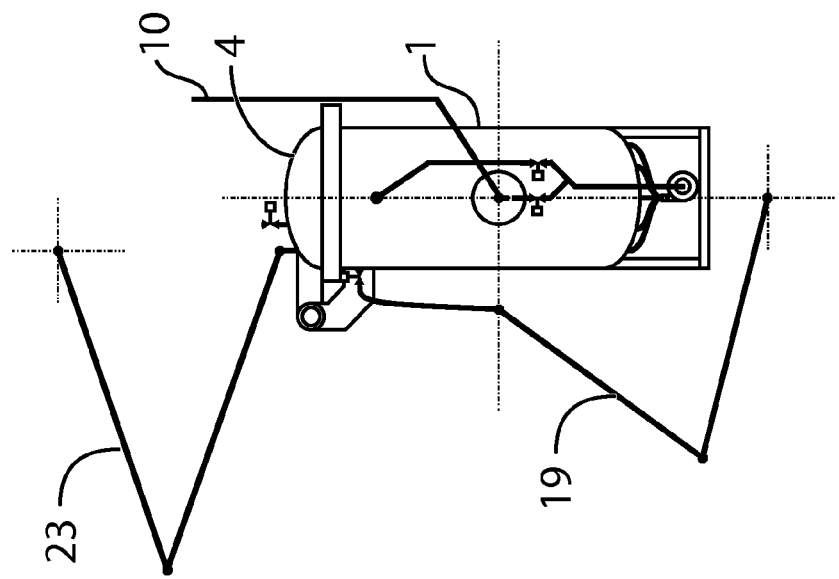
FIG. 6b illustrates the mechanical arrangement of the first machine embodiment during the recycle stage.
Figure 6A:
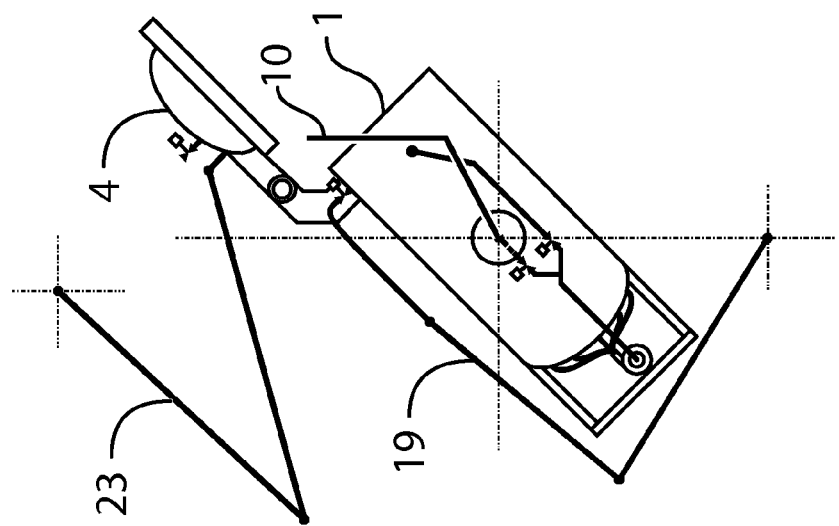
FIG. 6a illustrates the mechanical arrangement of the first machine embodiment during the filling stage.

In step 200, the container 1, in an open state shown in FIG. 6a, is filled with bitumen ore. The container is tilted to such an angle that the ore will hit the side of the container as it is filled from the top, lessening any battering. A predetermined amount of ore is dumped into the vessel. The amount will allow sufficient space for the solvent to be added later.

The container is rotated to a vertical position in step 210, FIG. 6b. The lid 4 is rotated into the closed position using hinge system 5. The sealing mechanism 6 locks the lid to the container and may confirm that the container is sealed by means of position sensors that indicate that the mechanism has achieved full locked position.

In step 220, the container pressure is drawn down to near vacuum pressure to remove as much air as possible from the container. This may be accomplished by drawing the air through the vapor recovery system valve 22. The air must be separated from the solvent because oxygen causes corrosion in downstream equipment, and because of possible explosive/flammable mixtures of oxygen and solvent. The container is then pressurized with solvent in step 230. The air is then allowed to rise above the solvent, due to its lower density, and then vented to the flare system via valve 24. This method has the disadvantage that some solvent is lost to the flare system.

In step 230, valve 7 is opened and second mixture bitumen enriched (gray) solvent flows into header 10 up to valve 13.

Valve 13 is then opened and the gray solvent liquid flashes to vapor as it enters the vessel. The pressure is the vapor pressure of the solvent at the temperature of the ore and the solvent as they mix together. The solvent flushes upward through the ore providing an initial mixing period during the filling phase. The amount of solvent to be added will be determined by the composition of the ore. High quality ore will require more solvent to maintain the 1:1 ratio that has been used as the design basis. Valve 13 and valve 7 close once the correct amount of solvent has been added to the vessel.

Valve 14 is opened and pump 16 is turned on for a predetermined period in step 240 to flush the ore with solvent. For high quality ore, the mixing period could be as low as five minutes. For lower grade ore, this period could be extended to ten minutes or longer. The solvent will flow down recycle pump header pipe 15 to the pump. The pump will push the solvent up through the discharge header 17, and through the openings in the vessel. This will cause zones of high turbulence to be created at the bottom of the container where the various inlet streams impinge on the ore body. The ore will be washed quickly in this zone. Smaller particles will be carried upward because the upward velocity of the solvent stream is greater than their settling velocity. Larger unwashed particles will then settle between the inlet streams and be washed in turn. At the end of the period, the ore will be stratified with the largest particles at the bottom and the smaller particles at the top of the ore body in the vessel. Depending on the solvent used, some fines will settle immediately while others will remain suspended in the solvent-bitumen mixture. In another embodiment, the method of this step could be accomplished by replacing the recycle pump and associated piping with a ring assembly, as part of the support system 3. The ring (or rings) around the circumference of the container would permit the container to rotate on its longitudinal axis, like a cement mixer, agitating and mixing the ore. At the end of step 240 pump 16 is stopped but valve 14 remains open to allow drainage of pipe 15 in subsequent steps.

In step 250 the fines flushed upwards during step 240 are allowed to settle downward towards the solids layer by gravity. The fines do not need to be allowed to settle completely. The fines layer only needs to descend to a level below the drain point such that the draining cycle, step 260 may begin without carrying them out of the vessel. The drain cycle will itself take time which will allow the fines level to descend down to the main solids layer below.

Figure 6C:
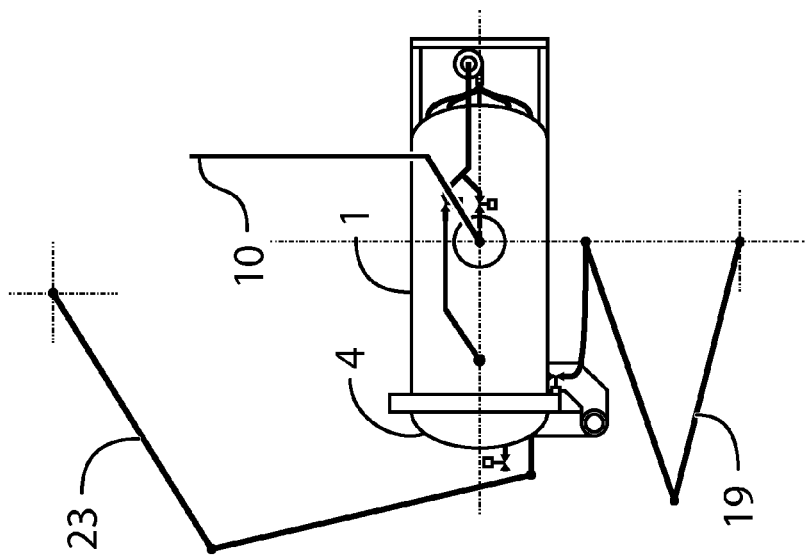
FIG. 6c illustrates the mechanical arrangement of the first machine embodiment during the draining stage.
Figure 6D:
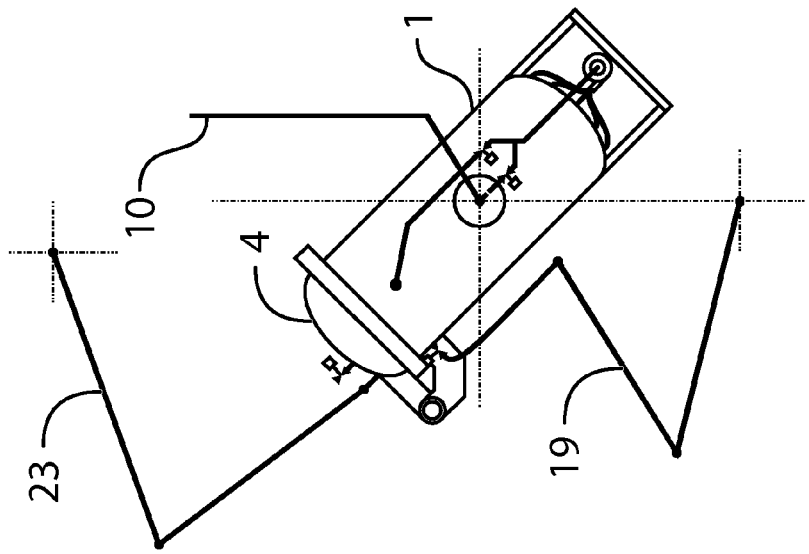
FIG. 6d illustrates the mechanical arrangement of the first machine embodiment in its fully drained and depressuring stages.

In step 260, the container is rotated to an angle away from the vertical as shown on FIG. 6c. The container pivot assemblies 3 are slowly powered to tilt the container. Valves 18 and 20 are opened. The solvent-bitumen-fines mixture drains out to the main drain to be collected and processed by other equipment. The speed of rotation of the vessel is such as to allow the quickest possible draining of the vessel while minimizing the fines carry over. An analogy would be the process of decanting wine. At the end of this step, Valves 14, 18 and 20 are closed, the vessel is filled with solvent vapor and there is liquid solvent-bitumen mixture in the solids layer. The orientation of the vessel is as per FIG. 6d.

In step 270, the vessel is rotated to the upright position (FIG. 6b) and valves 8 and 13 are opened to fill the vessel with clean solvent. As in step 230, the solvent is flushed upwards through the ore body. Once the same amount of solvent as step 230 has been added, valves 8 and 13 are closed.

Step 280's purpose is mainly to recover the bitumen trapped in the solids body. Valve 14 is opened and pump 16 is turned on for a period of time to ensure complete mixing of the solvent with the solids body. If sufficient mixing has already occurred in step 270, this step may be omitted. At the end of this step, pump 16 is stopped and valve 14 remains open for drainage.

In step 290, valves 9 and 13 are opened to add water to the vessel to displace solvent-bitumen mixture trapped in the solids body upwards. Typically this volume would be in the range of 35-40% of the solids volume. At the end of this step valves 9 and 13 are closed. It is important to note that this water will be largely made up of fines water that has already been used in downstream equipment to wash fines from the solvent bitumen mixture. As such, it contributes little or nothing to the water requirements of the system as a whole.

In step 300, the vessel is rotated to drain the second solvent-bitumen mixture to the gray drain. Valves 18 and 21 are opened and the pivoting mechanism 3 is powered to move the vessel. This step differs from step 260 in that the fines have already been removed so the draining may be executed more quickly. At the end of this step some water may be carried over with the solvent. This is acceptable. Valves 18, 21 and 14 are closed at the end of this step and the vessel is oriented as per FIG. 6*d*.

In step 310, the vessel contains solvent vapor and some liquid solvent in the solids body. A two stage depressuring operation is executed. Valve 22 is opened to vent the solvent to the vapor recovery header. Once the pressure of the vessel has equalized with the vapor recovery header, valves in the recovery system will close and a vacuum pump in that system will draw the pressure down to near vacuum to withdraw all solvent from the vessel. During this step it may be necessary to rotate the vessel via pivot system 3 to shift the solids body to allow vapors to escape. At the end of step 310, valve 22 is closed and the vessel is oriented as per FIG. 6*d*.

In step 320, valve 28 is opened to allow air to re-enter the vessel.

In step 330, the vessel is rotated to the vertical. When the vessel pressure has reached atmospheric it is unsealed using mechanism 6. Valve 28 is closed and the lid is opened using hinge system 5. The vessel will now be oriented as per FIG. 6*e*.

Figure 6F:
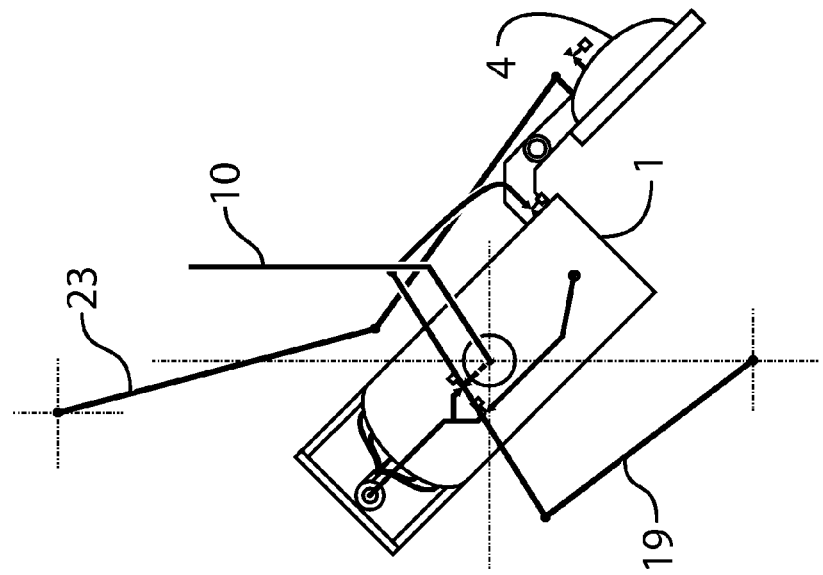
FIG. 6f illustrates the mechanical arrangement of the first machine embodiment during the emptying and cleaning stages.
Figure 6E:
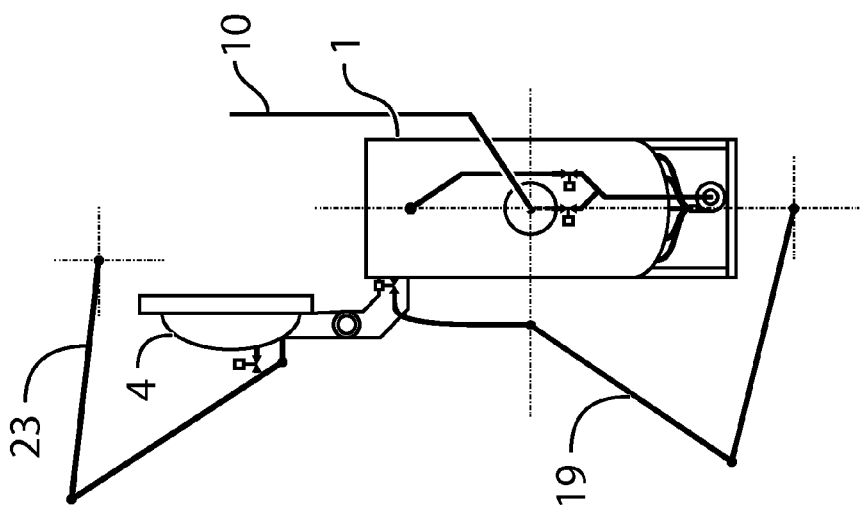
FIG. 6e illustrates the mechanical arrangement of the first machine embodiment in the depressured state.

In step 350, the container is rotated to the dump position, using pivots 3, as shown in FIG. 6*f*. The bitumen depleted sand in the container is dumped out by gravity to a collection system below. The water system may be used to flush out the recycle system and encourage sand to fall out of the vessel. This may be done by opening valves 9 and 13 for a period. Additionally, special purpose cleaning piping may be added to use this water system to spay various parts of the vessel and sealing surfaces. Further, cleaning equipment outside the machine itself may be required. As in step 290 the water to be used will come from the fines wash effluent.

In step 360, The container is rotated back to the filling position, as shown in FIG. 6*a*, using pivots 3.

The batch cleaning machine is comprised of the following parts, as illustrated in FIG. 3.

The pressure container 1 is designed in the first embodiment as a pressure vessel capable of containing the ore and solvent at the solvent vapor pressure at the operating temperature.

In another embodiment, the vessel could be a flexible tube with openings at the top and bottom to allow the oil sand ore to be dumped in and then be opened to dump the cleaned sand out at the end of the cycle. The container supports 2 connect the machine to the supporting structure.

The container pivot assemblies 3 allow the container to rotate for filling, cleaning, draining and dumping. The pivot assemblies may be hydraulic, gear driven or even cable driven. The assemblies will have position sensors to allow the control system to automatically orient the container. In another embodiment, the pivot assembly would include a circumferential ring which would permit the vessel to be rotated on its longitudinal axis. This feature would replace the recycle pump system 16.

The container lid 4 forms part of the pressure containing part of the machine along with the container 1.

The container hinge mechanism 5 rotates the lid upward to permit filling and dumping, and downward for sealing. The mechanism may be hydraulic or electric gear driven and is equipped with position sensors to permit the control system to automatically orient the lid.

The container sealing system 6 may be a ring (as shown) like that seen on sealing jars holding the lid onto the pressure container. The ring may be a segmented screw which would mate with threads on the pressure container and seal with a $1/16^{th}$ turn. In other embodiments, the sealing system is a series of hydraulically operated clamps. Another embodiment has a series of bolts on the pressure container which mate with nuts in the lid (or the reverse). The nuts or bolts may be power driven to close and seal the container. The sealing system may be hydraulic, pneumatic or electric gear driven. The system has position sensors to indicate that the lid and container have mated. In another embodiment, the sealing system for the flexible vessel is comprised of two plates which press together to seal a flexible tube 1.

The sealing system has dual seal rings in yet another embodiment. The dual seal rings would allow the inter seal ring annulus to be pressurized to a pressure intermediate between atmospheric and the operating pressure. Failure of the outer or inner seal ring would instantly be noted by a change of pressure in the annulus. This feature provides positive indication that the container is sealed properly and prevents undetected leakage of solvent. The air removal in step 220 permits indication of loss of containment before solvent is added to the vessel.

The automated gray solvent inlet valve 7 opens to add second mixture bitumen enriched solvent from the gray solvent system to the vessel.

The automated clean solvent inlet valve 8 opens to add clean solvent to the vessel from the solvent recovery system.

The water inlet valve 9 opens to add water to the vessel from fines wash effluent system.

All fluids entering the pressure container flow through the inlet header 10 which is fixed to the machine support structure. The header must be free draining into the vessel so that solvents are not trapped there in between cycles. As depicted in FIG. 3, the header is a solid pipe material; however in some embodiments the pipe is made of completely or partially flexible hose.

Pipe joints 11 are 90° elbow pairs which have a seal which permits one elbow to rotate with respect to the other elbow. One side of the joint is fixed to the machine support structure. This joint permits the pipe on the rotating side to move with the pressure container. These joints may also be flexible hoses Pipe joints 12 are 90° elbow pairs which have a seal which permits one elbow to rotate with respect to the other elbow. Both sides of the joint are connected to pipe which is free to move with the pressure container 1. These joints may also be flexible hoses.

Pressure container inlet valve 13 is an automated valve that opens to permit the main inlet flows to the pressure container. Valve 13 also serves to seal the pressure container to leaks in any of the upstream valves (7, 8 or 9).

Recycle pump inlet header valve 14 allows solvent to drain from the top of the pressure container to the inlet of the recycle pump.

Recycle piping 15 allows solvent to flow to the recycle pump, and is also the inlet point for liquids to the vessel.

The recycle pump 16 circulates the solvent upward through the material comprising bitumen to speed the solution of the bitumen in the solvent. This pump is designed as a slurry pump to be able to pass stones of moderate size.

The recycle pump discharge header 17 is comprised of a series of pipes connected to the discharge side of the recycle pump. The pipes carry the recycle solvent to a number of inlet ports on the bottom of the container 1. These pipes are especially fabricated to have long radius bends and smooth transitions to discourage any solids that may pass through the pump from getting stuck in the header.

The automated container drain valve 18 opens during the draining and depressuring phases of the cleaning cycle to allow liquids and then solvent vapors to be removed from the vessel.

The outlet drain header 19 is used to remove all fluids from the vessel. It is comprised of a linkage of pipes which move with the vessel as it rotates. During the settling and draining steps 260 and 300 the header is free draining to the clean solvent and gray solvent systems.

The automated main drain valve 20 opens to allow the first stage bitumen enriched solvent mixture to be sent to the next stage of separation.

The automated gray drain valve 21 opens to allow the second stage bitumen enriched solvent mixture to be sent to the gray drain system.

The automated vapor recovery valve 22 opens to allow solvent vapors to flow to the vapor recovery system.

The vent header 23 is required to connect the vessel to the flare system so that vapors can be safely routed away from the vessel in the case of an emergency.

The vent header is comprised of a linkage of pipes which move with the vessel as it rotates.

In some embodiments, the vent header may also contain a separate pipe and valve to permit vented air with a small component of solvent vapor to be sent to some of the various heaters associated with the overall plant to be used as fuel.

The depressuring valve 24 is an automated valve which opens to depressure the vessel in the case of an emergency. In other embodiments, it may also be used to permit air trapped in the vessel when it is sealed to be vented to the flare system.

Pressure safety valves 25, 26 and 27 are required by safety code to protect the container 1, inlet header 10 and outlet header 19 from overpressure.

Air vent valve 28 is an automated valve that opens at the end of the cleaning cycle, when all the solvents have been removed to allow atmospheric air into the vessel prior to unsealing the lid 4.

As used herein, spatial or directional terms, such as "left," "right," "front," "back," and the like, relate to the subject matter as it is shown in the drawing Figures However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

What is claimed is:

1. A method of treating an oil sand ore containing bitumen, asphaltenes, and sand particles in a sealed container for separating the bitumen from the oil sand ore, comprising the steps of:
    i) adding a quantity of said oil sand ore into said container;
    ii) sealing said container;
    iii) adding a light paraffinic solvent selected from the group consisting propane and butane into said container at a temperature and pressure sufficient for said solvent to be in a liquid state in said chamber;
    iv) producing a liquid blend including at least some of the light paraffinic solvent and bitumen;
    v) agitating said liquid blend to dissolve some of the bitumen into the light paraffinic solvent;
    vi) removing said liquid blend including said some of the light paraffinic solvent and the bitumen dissolved therein for further processing by decanting said liquid blend from the container such that a portion of the light paraffinic solvent remains in the container; and
    vii) reducing the pressure of said container to allow said portion of the light paraffinic solvent remaining in the container to vaporize and be removed.

2. The method according to claim 1 wherein the light paraffinic solvent is selected from the group consisting of propane and butane.

3. The method according to claim 2 wherein the bitumen is dissolved into the solvent but asphaltenes in the oil sand ore are not dissolved into the solvent.

4. The method according to claim 1 wherein said light paraffinic solvent added to the container in step iii) comprises a pure solvent, wherein said liquid blend removed from the container in step vi) produces a gray solvent; and wherein the method further includes, prior to the addition of the light paraffinic solvent, the following steps:
    adding into the container the gray solvent produced from a previously treated oil sand ore;
    agitating the gray solvent with the bitumen to dissolve some of the bitumen into the gray solvent; and
    removing some of the gray solvent including some of the bitumen dissolved therein by decanting from the container.

* * * * *